Oct. 20, 1959     B. H. SHORT     2,909,760
DIRECTION SIGNAL SYSTEM
Filed Nov. 15, 1954
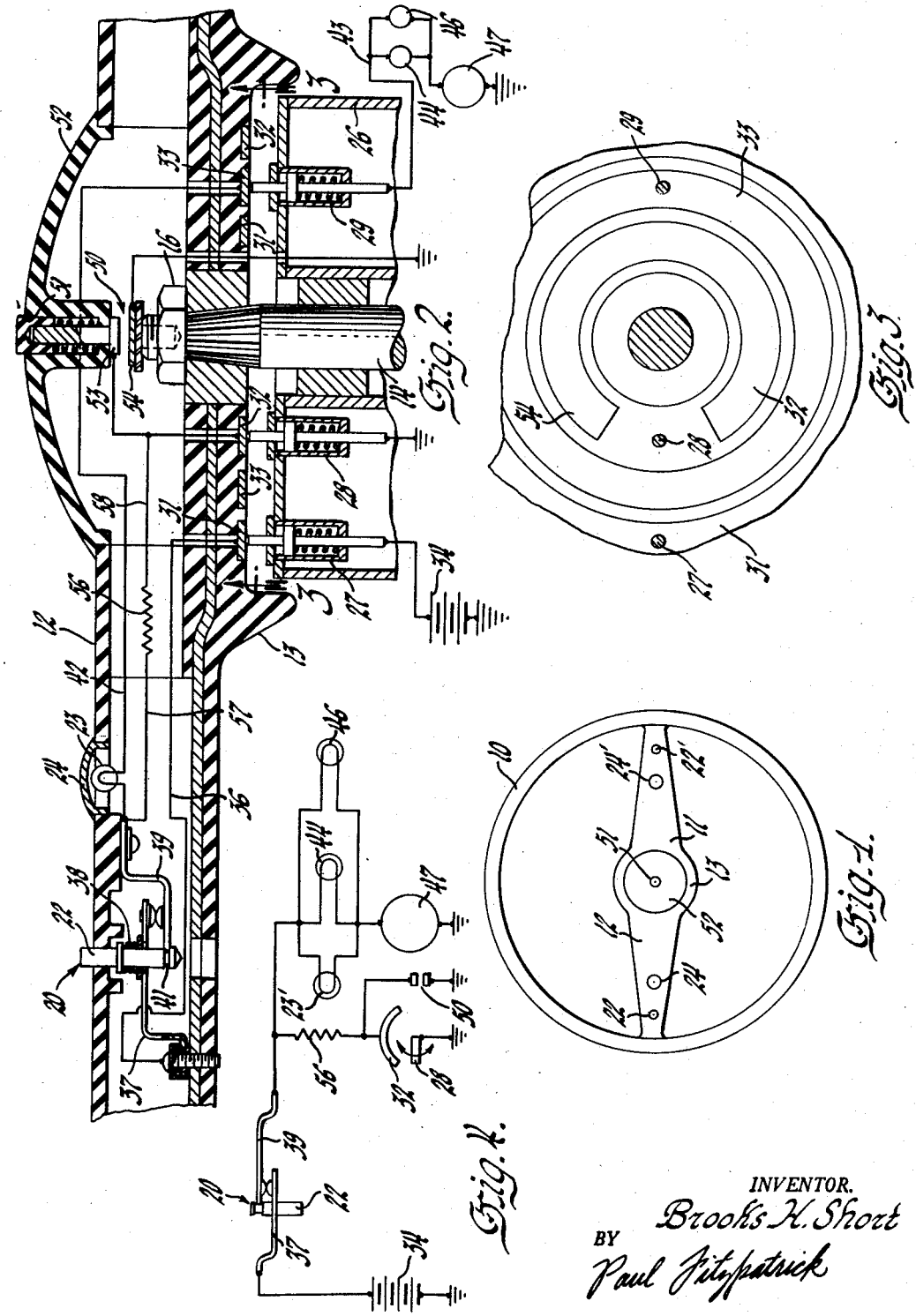
INVENTOR.
Brooks H. Short
BY
Paul Fitzpatrick

United States Patent Office 2,909,760
Patented Oct. 20, 1959

2,909,760

DIRECTION SIGNAL SYSTEM

Brooks H. Short, Anderson, Ind., assignor to General Motors Corporation, Detroit, Mich., a corporation of Delaware Application November 15, 1954, Serial No. 468,813

4 Claims. (Cl. 340—73)

My invention relates to signaling systems, and is particularly directed to a system adapted for use as a direction signal for motor vehicles. The principal object of the invention is to obviate the mechanical complexity inherent in direction signal systems now employed. Another object of the invention is to provide convenient setting and cancelling mechanisms for a direction signal. A further object is to provide direction signal initiating and cancelling mechanism of a nature readily incorporated in an automobile steering wheel.

The nature of the invention and the advantages thereof will be apparent from the succeeding detailed description of the preferred embodiment of the invention and the accompanying drawings in which:

Figure 1 is a plan view of an automobile steering wheel;

Figure 2 is a sectional view thereof taken on a plane including the axis of rotation of the wheel and extending through the spokes, including a wiring or circuit diagram;

Figure 3 is a partial sectional view taken on the plane indicated in Figure 2 showing the slip rings and brushes; and Figure 4 is a schematic diagram of a turn signal circuit.

It may be stated by way of introduction that the right and left turn signal systems may be independent except for a few common elements, and are identical. Therefore, the description herein will be directed to the left turn signal, it being understood that the right turn signal is the same.

Referring first to Figure 1, there is illustrated a steering wheel comprising a rim 10, spokes 11 and 12, and a hub 13. The hub is fixed on steering shaft 14 (Figure 2) by a nut 16. Push buttons 22 and 22' actuate the left and right turn signals respectively. The energization of the signals may be indicated by pilot lights such as 23 in Figure 2 under bezels 24, 24' on the steering wheel spokes.

Electrical circuits to the mechanism in the steering wheel may be made through slip ring and brush assemblies mounted in the hub 13 of the steering wheel and on the steering column 26. As illustrated in Figure 2, spring-urged brush assemblies 27, 28 and 29 mounted on the top of the steering column coact respectively with slip rings 31, 32 and 33 on the lower face of the steering wheel (see also Figure 3). Brush 27 is connected to a battery 34 and the 360° slip ring 31 is connected through lead 36 to switch contact 37 of a normally open switch 20 closed by the push button 22.

This switch is of the type disclosed in the application of Buck and Lautzenhiser for Resettable Circuit Breaker, Serial No. 319,858, filed November 12, 1952 (Patent 2,774,844). It is a normally open switch closed by the button 22 and held closed by an overcurrent responsive bimetal element acting as a latch. Since the details of the switch are described in that application and are immaterial to the present invention, it is described only briefly herein. The switch is shown in closed and latched condition in Figure 2. Push button 22 acting through spring 38 depresses spring contact arm 37 into engagement with bimetallic contact arm 39 fixed on the steering wheel spoke. The free end of arm 39 engages in a notch 41 in the plunger 22 to hold the switch closed. Arm 39 is heated by current passing through it and when the current is excessive, it bends to the right as shown in Figure 2, whereupon the plunger is released and the arm 37 moves upwardly under its own resilience to break the circuit.

Contact arm 39 is connected through lead 42 to slip ring 33, brush 29, lead 43, front and rear turn signal lights 44 and 46, respectively (connected in parallel), and flasher 47 to ground. As long as the circuit remains closed at switch 20 the signal lights will be in operation.

The pilot light 23 of Figure 2 is a low voltage light and is connected in series in the lead 42.

To break contact at switch 20, an overload to heat the bimetal is put on the switch in either of two ways. The signal may be cancelled by a normally open push button switch 50 comprising a plunger 51 mounted in the steering wheel hub cover 52, which, upon being depressed, engages contact 53 with grounded contact 54 on the upper end of the steering shaft 14. An overload resistance 56 is connected between switch 20 and switch 50 by leads 57 and 58. The load imposed by current flowing through resistor 56 is sufficient to cause rapid release of the switch 20.

The turn signal is also cancelled by means responsive to the rotation of the steering wheel. In the normal or rest position of the steering wheel, as indicated in Figure 3, brush 28 does not engage the arcuate conducting sector 32 but, as the wheel is turned, contact between these connects lead 58 to ground through brush 28, tripping switch 20.

The arcuate extent of the contact 32 may be whatever is desired to secure the desired amount of rotation of the steering wheel up to 180° in either direction before the signal is cancelled.

As will be apparent, switch 50, contact 32, and slip ring 31 may be connected also to the right turn signal circuits. A fourth slip ring (not shown) corresponding to slip ring 33 will be required to connect the circuit to the right turn lights.

Figure 4 is a diagram of a system similar to that of Figure 3, the differences being that the slip ring and brush assemblies 27, 31 and 29, 33 are omitted from this diagram and the pilot light 23' is connected in parallel with the signal lights 44 and 46. With this connection of the pilot light, it may be located off the steering wheel or, by the provision of flexible leads or sliding contacts, it may be on the steering wheel. Since parts in Figure 4 corresponding to those of Figure 3 are similarly identified, it is believed that no further explanation of Figure 4 is needed.

It will be apparent from the foregoing description that the invention provides a very simple turn signal system, both from mechanical and electrical standpoints, and one which is very convenient to operate.

The description herein of the preferred embodiment of the invention for the purpose of explaining the principles thereof is not to be construed as limiting the invention, since many modifications of the structure may be made within the scope of the invention by the exercise of skill in the art.

I claim:

1. A signal system comprising, in combination, a series circuit including a source of current, a signal-energizing switch, and a signal device; the signal-energizing switch being a manually operable self-latching overload released switch, the signal device having a normal current demand below that effective to release the signal-energizing switch; a shunt circuit in parallel with the signal device connected to the source of current through the signal-energizing switch, the shunt circuit including normally open cancelling switch means, and having sufficiently low impedance that closing the cancelling switch means will overload and thereby release the signal-energizing switch.

2. A direction signal system for a dirigible vehicle having a steering wheel; the system comprising, in combination, a series circuit including a source of current; a signal-energizing switch, and a direction signal; the signal-energizing switch being a manually operable self-latching overload released switch and being mounted on the steering wheel, the direction signal having a normal current demand below that effective to release the signal-energizing switch; a shunt circuit in parallel with the direction signal connected to the source of current through the signal-energizing switch, the shunt circuit including normally open cancelling switch means, and having sufficiently low impedance that closing the cancelling switch means will overload and thereby release the signal-energizing switch.

3. A direction signal system for a dirigible vehicle having a steering wheel; the system comprising, in combination, a series circuit including a source of current, a signal-energizing switch, and a direction signal; the signal-energizing switch being a manually operable self-latching overload released switch and being mounted on the steering wheel, the direction signal having a normal current demand below that effective to release the signal-energizing switch; a shunt circuit in parallel with the direction signal connected to the source of current through the signal-energizing switch, the shunt circuit including normally open cancelling switch means, and having sufficiently low impedance that closing the cancelling switch means will overload and thereby release the signal-energizing switch; the cancelling switch means being connected to the steering wheel so as to be closed by movement of the steering wheel.

4. A direction signal system for a dirigible vehicle having a steering wheel; the system comprising, in combination, a series circuit including a source of current, a signal-energizing switch, and a direction signal; the signal-energizing switch being a manually operable self-latching overload released switch and being mounted on the steering wheel, the direction signal having a normal current demand below that effective to release the signal-energizing switch; a shunt circuit in parallel with the direction signal connected to the source of current through the signal-energizing switch, the shunt circuit including normally open cancelling switch means, and having sufficiently low impedance that closing the cancelling switch means will overload and thereby release the signal-energizing switch; the cancelling switch means including two normally open switches connected in parallel, one said normally open switch being connected to the steering wheel so as to be closed by movement of the steering wheel, and the other said normally open switch being a manually operable switch on the steering wheel operable in any position of the steering wheel.

References Cited in the file of this patent

UNITED STATES PATENTS

| | | |
|---|---|---|
| 1,437,086 | Bater | Nov. 28, 1922 |
| 1,442,313 | Watson | Jan. 16, 1923 |
| 1,530,929 | Brobst | Mar. 24, 1925 |
| 1,993,540 | Brogger | Mar. 5, 1935 |
| 2,040,923 | Doane | May 19, 1936 |
| 2,108,454 | Steinman | Feb. 15, 1938 |
| 2,673,906 | Butler | Mar. 30, 1954 |

FOREIGN PATENTS

| | | |
|---|---|---|
| 632,075 | France | July 9, 1926 |